United States Patent [19]

Bauer et al.

[11] Patent Number: 5,597,387
[45] Date of Patent: Jan. 28, 1997

[54] WATER-SOLUBLE POLYAZO DYESTUFFS

[75] Inventors: Wolfgang Bauer, Maintal; Dieter Baumgart, Egelsbach; Walter Zöller, Klingenberg, all of Germany

[73] Assignee: Hoechst AG, Germany

[21] Appl. No.: 555,388

[22] Filed: Nov. 9, 1995

[30] Foreign Application Priority Data

Nov. 19, 1994 [DE] Germany ............... 44 41 232.0

[51] Int. Cl.$^6$ .............. D06P 3/32; C09B 39/00; C09D 11/00; C07C 245/22
[52] U.S. Cl. .............. 8/437; 8/506; 8/673; 8/681; 8/687; 106/22 R; 106/22 H; 106/22 K; 534/728; 534/806; 534/582; 534/588; 534/614
[58] Field of Search .................. 534/728, 806, 534/582, 588, 614; 8/437, 669, 681, 687, 506, 673; 106/22 R, 22 H, 22 K

[56] References Cited

FOREIGN PATENT DOCUMENTS

| | | |
|---|---|---|
| 0218143 | 4/1987 | European Pat. Off. . |
| 1379229 | 3/1965 | France . |
| 2914002 | 10/1980 | Germany . |
| 55-151071 | 11/1980 | Japan . |
| 62-156177 | 7/1987 | Japan . |

OTHER PUBLICATIONS

Chemical Abstracts, vol. 94, No. 20, May 18, 1981, *abstract No.158524z.*
Chemical Abstracts, vol. 108, No. 2, Jan. 11, 1988, *abstract No.7635t.*

*Primary Examiner*—Paul Lieberman
*Assistant Examiner*—Caroline L. Dusheck
*Attorney, Agent, or Firm*—Connolly & Hutz

[57] ABSTRACT

The present invention relates to water-soluble polyazo dyestuffs of the general formula I

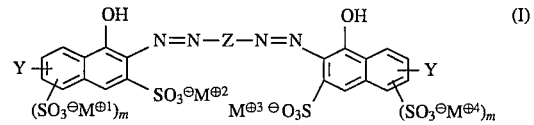

wherein Y, Z, m and $M^{\oplus 1}$ to $M^{\oplus 4}$ are as defined in claim 1, processes for dyeing leather and paper with the polyazo dyestuffs, and recording liquids and inks containing the polyazo dyestuffs.

14 Claims, No Drawings

WATER-SOLUBLE POLYAZO DYESTUFFS

The present invention relates to water-soluble polyazo dyestuffs, to processes for their preparation and to their use.

Polyazo dyestuffs are already known and are described, for example, in FR-A 1 379 229, DE-A 29 14 002, C.A.107, 156638n, C.A.94, 158524, or C.A.108, 7635t. They can be used for dyeing naturally occurring and synthetic fibre materials, such as cotton, regenerated cellulose, paper, polyamide or wool, and also for dyeing leather.

It is furthermore known that certain trisazo dyestuffs can be used for the preparation of writing inks and recording liquids (see, for example, EP-A 212 345, DE-A 37 43 527 or DE-A 40 25 611).

It has now been found, surprisingly, that the polyazo dyestuffs according to the invention have significant advantages in respect of their dyeing properties compared with the prior art, which is revealed, in particular, in the dyeing of leather and paper. Furthermore, they are also outstandingly suitable for the preparation of writing inks and recording liquids for the ink jet printing process.

The present invention thus relates to water-soluble polyazo dyestuffs of the general formula I

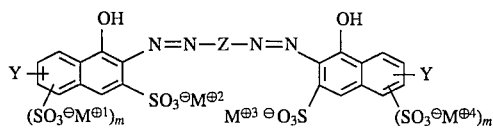

wherein
Y is

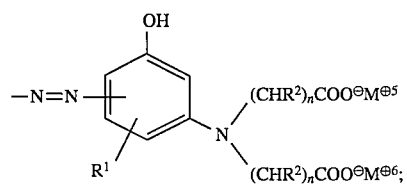

Z is

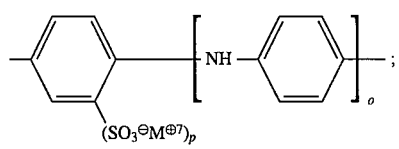

$R^1$ is hydrogen, $(C_1-C_4)$-alkyl or halogen;
$R^2$ is hydrogen or $(C_1-C_4)$-alkyl;
$M^{\oplus 1}$ to $M^{\oplus 7}$ independently of one another are a cation;
m, o and p independently of one another are 0 or 1; and
n is 1 or 2.

$(C_1-C_4)$-alkyl is, in particular, methyl, ethyl, n-propyl, i-propyl, n-butyl, i-butyl, sec-butyl or tert-butyl.

Halogen is, in particular, fluorine, chlorine, bromine or iodine, chlorine and bromine being preferred.

A cation as one of the radicals $M^{\oplus}$ can be inorganic or organic. Suitable inorganic cations are, in particular, alkali metal and alkaline earth metal cations. Because of their double positive charge, alkaline earth metal cations are in each case formed by two radicals $M^{\oplus}$ here.

Preferred inorganic cations are especially preferably those of lithium and sodium.

Suitable organic cations are, in particular, ammonium ions of the general formula II

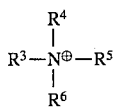

wherein $R^3$ to $R^6$ independently of one another are hydrogen, $(C_1-C_4)$-alkyl, hydroxy-$(C_1-C_4)$-alkyl or hydroxyethoxy-$(C_1-C_4)$-alkyl.

The group Y preferably substitutes positions 1, 2 or 3 of the naphthalene skeleton, position 2 being particularly preferred. The groups $—(SO_3^{\ominus}M^{\oplus 1})_m$ and $—(SO_3^{\ominus}M^{\oplus 4})_m$ preferably substitute positions 3 and 4 of the naphthalene skeleton.

In preferred polyazo dyestuffs of the general formula I, m is 0, $R^1$ is hydrogen and $R^2$ is hydrogen or methyl.

In particularly preferred polyazo dyestuffs of the general formula I, $R^1$ and $R^2$ are hydrogen; m is 0; n, o and p are 1 and $M^{\oplus 1}$ to $M^{\oplus 7}$ independently of one another are $Li^{\oplus}$, $Na^{\oplus}$ or an ammonium ion of the general formula II, wherein $R^3$ to $R^6$ independently of one another are hydrogen or hydroxy-$(C_1-C_4)$-alkyl.

The polyazo dyestuffs of the general formula I according to the invention can be prepared in a manner known per se. For example, a compound of the general formula III

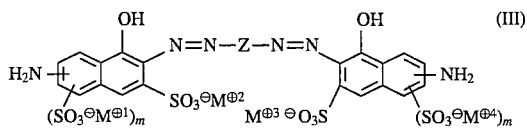

wherein Z, m and $M^{\oplus}$ to $M^{\oplus 4}$ are as defined above, is bis-diazotized and the product is coupled with a compound of the general formula IV

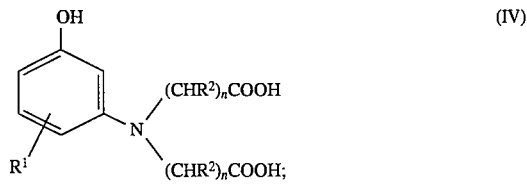

wherein $R^1$, $R^2$ and n are as defined above, and if appropriate the product is converted into the desired salt form. This coupling reaction is preferably carried out at pH values of 7 to 12, particularly preferably 7.5 to 9.5.

The compounds of the general formula III can be prepared, for example, by bis-diazotizing a diamine of the general formula V $$H_2N—Z—NH_2 \quad\quad (V)$$

wherein Z is as defined above, and coupling the product with a compound of the general formula VI

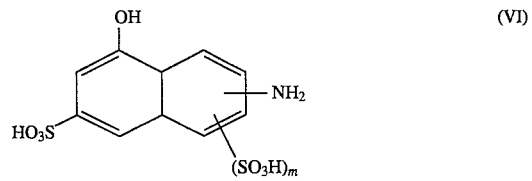

wherein m is as defined above. This coupling reaction is also preferably carried out at pH values of 7 to 12, particularly preferably 7.5 to 9.5.

It is preferable not to isolate the compounds of the general formula III but to follow their preparation directly with the further bis-diazotization and coupling described above.

The compounds of the general formula IV can be obtained by alkylation of compounds of the general formula VII

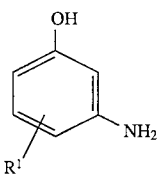

wherein $R^1$ is as defined above, with compounds of the general formula VIII

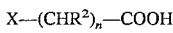

wherein $R^2$ and n are as defined above and X is chlorine, bromine or iodine. This reaction is preferably carried out in an aqueous reaction medium at pH values of 3 to 8, particularly preferably 5 to 8, and at temperatures of 40° to 140° C., particularly preferably 80° to 120° C. The resulting compounds of the general formula IV are preferably employed as an aqueous solution, without intermediate isolation, in the reaction with the compounds of the general formula III.

Suitable compounds of the general formula VII are, for example, 3-aminophenol, 4-methyl-3-aminophenol, 5-amino-2-methylphenol, 4-chloro-3-aminophenol and 4-ethyl-3-aminophenyl. 3-Aminophenol is particularly preferred.

Suitable compounds of the general formula VIII are, for example, monochloroacetic acid, monobromoacetic acid, 2-chloropropionic acid, 2-bromopropionic acid, 3-chloropropionic acid, 3-bromopropionic acid and salts thereof, monochloroacetic acid and sodium monochloroacetate being preferred.

Suitable compounds of the general formula V are, for example, 1,4-phenylenediamine, 1,4-phenylenediamine-2-sulphonic acid, 4,4'-diaminodiphenylamine and 4,4'-diaminodiphenylamine-2-sulphonic acid. 4,4'-Diaminodiphenylamine-2-sulphonic acid is particularly preferred.

Suitable compounds of the general formula VI are, for example, 2-amino-8-hydroxynaphthalene-6-sulphonic acid, 2-amino-8-hydroxynaphthalene-3,6-disulphonic acid, 3-amino-8-hydroxynaphthalene-6-sulphonic acid, 1-amino-8-hydroxynaphthalene-4,6-disulphonic acid and 1-amino-8-hydroxynaphthalene-3,6-disulphonic acid, of which 2-amino-8-hydroxynaphthalene-6-sulphonic acid is particularly preferred.

The compounds of the general formula V, VI, VII and VIII are known and are commercially obtainable and/or can be obtained by known preparation processes.

After the coupling reaction, the polyazo dyestuffs of the general formula I according to the invention can be isolated, by addition of mineral acids, in the form of the free acid ($M^{\oplus 1}$ to $M^{\oplus 7}=H^{\oplus}$), which can be freed from inorganic salts by washing with water or acidified water. The colour acid of low salt content thus obtained can then be neutralized in an aqueous medium with hydroxides and/or carbonates, for example LiOH, $Li_2CO_3$, NaOH, $Na_2CO_3$ or $K_2CO_3$, or with amines. Preferred amines here are, in particular, ammonia, ethanolamine, diethanolamine, triethanolamine, N-methyl-N-ethanolamine, N-methyl-N,N-diethanolamine, 2-(2-hydroxyethoxy)-ethanamine, di-2-(2-hydroxyethoxy)-ethanamine and tri-2-(2-hydroxyethoxy)-ethanamine.

The polyazo dyestuffs of the general formula I according to the invention are outstandingly suitable for dyeing naturally occurring and synthetic fibre materials, and in particular they are also distinguished in the depth of colour on leather.

They are furthermore excellently suitable for the preparation of writing inks and recording liquids.

The aqueous solutions described above of the polyazo dyestuffs of the general formula I according to the invention can be used directly for the preparation of recording liquids. However it is also possible first to isolate them by drying, for example spray drying, and then to further process them to recording liquids.

The finished recording liquids in general comprise 0.5 to 15% by weight of dyestuff (calculated as dry goods), 0 to 99% by weight of water and 0.5 to 99.5% by weight of solvent and/or humectant. In particular, the finished recording liquids comprise 0.5 to 15% by weight of dyestuff (calculated as dry goods), 40 to 85% by weight of water and 15 to 50% by weight of solvent and/or humectant. As a rule, the finished recording liquids also comprise other additives mentioned below.

The water used for the preparation of the recording liquids is preferably employed in the form of distilled or demineralized water. As well as water, an organic water-soluble solvent or a mixture of such solvents can also additionally be present in the recording liquids. Suitable solvents are, for example, mono- and polyhydric alcohols and ethers and esters thereof, thus, for example, alkanols, in particular having 1 to 4 C atoms, such as, for example, methanol, ethanol, propanol, isopropanol, butanol, isobutanol and tert-butanol; di- and trihydric alcohols, in particular those having 2 to 6 C atoms, for example ethylene glycol, propylene glycol, 1,3-propanediol, 1,4-butanediol, 1,5-pentanediol, 1,6-hexanediol, 1,2,6-hexanetriol, glycerol, diethylene glycol and dipropylene glycol; polyalkylene glycols, such as, for example, triethylene glycol, polyethylene glycol, tripropylene glycol and polypropylene glycol; lower alkyl ethers of polyhydric alcohols, such as, for example, ethylene glycol monomethyl or -ethyl or -propyl or -butyl ether, diethylene glycol monomethyl or -ethyl ether and triethylene glycol monomethyl or -ethyl ether; ketones and keto-alcohols, in particular those having 3 to 7 C atoms, such as, for example, acetone, methyl ethyl ketone, diethyl ketone, methyl isobutyl ketone, methyl pentyl ketone, cyclopentanone, cyclohexanone and diacetone alcohol; ethers, such as, for example, dibutyl ether, tetrahydrofuran and dioxane; esters, such as, for example, ethyl formate, methyl formate, methyl acetate, ethyl acetate, propylene acetate, butyl acetate, phenyl acetate, ethylglycol monoethyl ether acetate and 2-hydroxyethyl acetate; amides, such as, for example, dimethylformamide, dimethylacetamide and N-methylpyrrolidone; and furthermore urea, tetramethylurea and thiodiglycol.

Some of the abovementioned substances not only act as solvents but also additionally display other properties. Thus, for example, the polyhydric alcohols also act as humectants.

The following can also be added to the recording compositions: preservatives, such as, for example, phenol derivatives, cationic, anionic or nonionic surface-active substances (wetting agents), and agents for regulating the viscosity, for example polyvinyl alcohol, cellulose derivatives, or water-soluble naturally occurring or synthetic resins as film-forming agents or binders for increasing the adhesive strength and abrasion resistance.

Amines, such as, for example, ethanolamine, diethanolamine, triethanolamine, N,N-dimethylethanolamine and diisopropylamine, chiefly serve to increase the pH of the recording liquid. They are as a rule present in the recording liquid to the extent of 0 to 10% by weight, preferably 0.5 to 5% by weight.

Data on compositions of inks, in particular also those for the jet printing process, are to be found, for example, in De-A-2 132 324, DE-A-2 160 475, U.S. Pat. No. 4,024,096, U.S. Pat. No. 4,024,397 and U.S. Pat. No. 4,070,322. The precise composition of the recording liquid is of course adapted to suit the intended purpose of use.

In the case of recording liquids for the ink jet printing process, depending on the embodiment of this printing process, for example as a continuous jet, intermittent jet, pulse jet or compound jet process, further additives can also be added if appropriate, for example for buffering the pH or for adjusting the electrical conductivity, the specific heat, the thermal expansion coefficient and the conductivity.

The recording liquids can be prepared in a simple manner by mixing the components, which can be done, for example, by dissolving a dyestuff of the general formula I in water or if appropriate further diluting an aqueous solution obtained in the preparation of the dyestuff of the general formula I with water, and by then admixing the other additional components, such as solvents and the like.

The recording liquids comprising one or more dyestuffs of the general formula I are outstandingly suitable for use in printing, duplicating, marking, writing, drawing, stamping or recording processes, and in particular also in the ink jet printing process. Black prints of high quality which have a high sharpness and brilliance and good resistance to water, light and abrasion are obtained here. Compared with comparable dyestuffs, the polyazo dyestuffs of the general formula I according to the invention have a higher water-solubility and a better fastness to water, especially on weakly acid types of paper. Furthermore, they are advantages for toxicological reasons.

No separation of precipitates occurs during storage of inks according to the invention; furthermore, no blockage of the jets occurs when the inks according to the invention are employed in ink jet printing. Also no charges to the physical properties of inks according to the invention occur when they are used in an ink jet printer for a relatively long time with constant recirculation or intermittently with the ink jet printer being switched off in between.

EXAMPLE 1 a) Preparation of 3-hydroxyphenylimino-diacetic acid disodium salt 21.8 g of 3-aminophenol are introduced into 50 ml of water and the mixture is heated to 90° C. A solution of 47.7 g of sodium monochloroacetate in 75 ml of water is then added, the pH of the reaction mixture being kept at pH 6.5 to 7 by addition of 28.5 g of sodium bicarbonate. In order to bring the alkylation reaction to completion, the mixture is subsequently stirred at 90° to 95° C. for 4 hours. The resulting solution can be further processed without intermediate isolation of the 3-hydroxyphenyl-imino-diacetic acid obtained.

b) Preparation of the dyestuff 27.9 g of 4,4'-diaminodiphenylamino-2-sulphonic acid are bis-diazotized in a mixture of 200 ml of water and 50 g of 30% strength hydrochloric acid with a solution of 13.8 g of sodium nitrite in 50 ml of water at 0° to 5° C., with the addition of ice. After addition of the sodium nitrite solution, the mixture is subsequently stirred at 0° to 5° C. for 1.5 hours and excess nitrous acid is then eliminated with amidosulphonic acid.

The resulting solution of the bis-diazonium salt is then added to a mixture of 47.8 g of 2-amino-8-hydroxynaphthalene-6-sulphonic acid, 300 ml of water, 16.0 g of 50% strength sodium hydroxide solution, 46.8 g of sodium carbonate and 150 g of ice.

In order to bring the coupling reaction to completion, the mixture is subsequently stirred at pH 9 to 9.5 for 2 hours.

120 g of 30% strength hydrochloric acid and 150 g of ice are then added to the suspension of the resulting disazo dyestuff and diazotization is carried out by addition of a solution of 13.8 g of sodium nitrate in 50 ml of water. The mixture is subsequently stirred at 0° to 5° C. for 2 hours and excess nitrous acid is then removed with amidosulphonic acid.

The suspension of the resulting biz-diazonium salt is added, in the course of 1 hour, to a mixture of the aqueous solution, prepared according to a), of 3-hydroxyphenyliminodiacetic acid disodium salt, 27.4 g of sodium carbonate and 150 g of ice.

After the coupling reaction has gone to completion and 90 g of 30% strength hydrochloric acid have been added, the dyestuff which has precipitated out is filtered off and washed free from electrolytes with water.

Neutralization of a suspension of the resulting dyestuff paste in 500 ml of water with 70 ml of 5N lithium hydroxide solution and subsequent drying of the resulting dyestuff solution gives 123.5 g of the black polyazo dyestuff of the general formula I where $R^1$ and $R^2$=hydrogen, m=0, n, o and p=1 and $M^{\oplus 1}$ to $M^{\oplus 7}=Li^\oplus$.

The absorption spectrum of this dyestuff in water is $\lambda_{max}$=596 nm.

Further black dyestuffs according to the invention can be prepared in accordance with the information in the following table.

TABLE

| Example | Compound of the formula V | Compound of the formula VI | Compound of the formula IV | $M^\circ$ |
|---|---|---|---|---|
| 2 | 1 mol 1,4-phenylenediamine | 2 mol (OH, $NH_2$, $SO_3H$ naphthalene) | 2 mol (OH, $N(CH_2COOH)_2$ phenyl) | $Na^\oplus$ |
| 3 | 1 mol 4,4'-diaminodiphenyl-amine | 2 mol (OH, $NH_2$, $SO_3H$ naphthalene) | 2 mol (OH, $N(CH_2COOH)_2$ phenyl) | $\overset{\oplus}{H}N(CH_2CH_2OH)_3$ |

TABLE-continued

| Example | Compound of the formula V | Compound of the formula VI | Compound of the formula IV | M⊖ |
|---|---|---|---|---|
| 4 | 1 mol 4,4'-diaminodiphenyl-amine-2-sulphonic acid | 2 mol 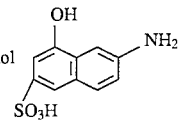 | 2 mol 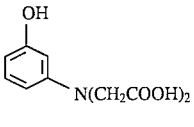 | Na⊕ |
| 5 | 1 mol 4,4'-diaminodiphenyl-amine-2-sulphonic acid | 1 mol 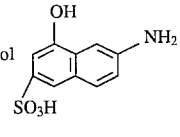  1 mol 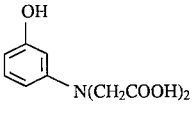 | 2 mol 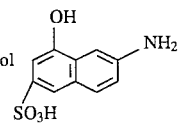 | H₃N⊕—CH₂CH₂OCH₂CH₂OH |
| 6 | 1 mol 4,4'-diaminodiphenyl-amine-2-sulphonic acid | 1 mol 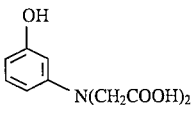  1 mol 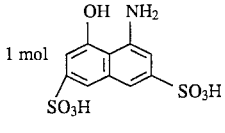 | 2 mol 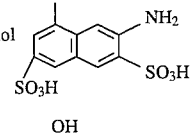 | Na⊕ |
| 7 | 1 mol 4,4'-diaminodiphenyl-amine-2-sulphonic acid | 2 mol 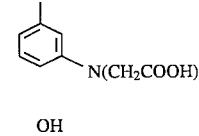 | 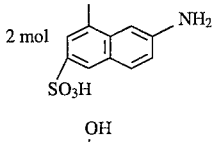 | NH₄⊕ |
| 8 | 1 mol 4,4'-diaminodiphenyl-amine-2-sulphonic acid | 2 mol 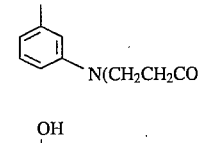 | 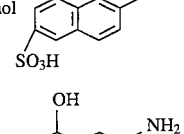 | Li⊕ |
| 9 | 1 mol 4,4'-diaminodiphenyl-amine-2-sulphonic acid | 2 mol 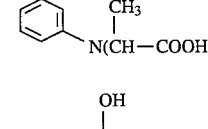 | 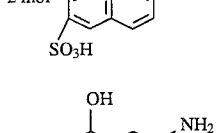 | Li⊕ |
| 10 | 1 mol 4,4'-diaminodiphenyl-amine-2-sulphonic acid | 2 mol 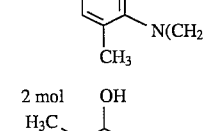 | 2 mol 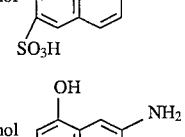 | Li⊕ |
| 11 | 1 mol 4,4'-diaminodiphenyl-amine-2-sulphonic acid | 2 mol 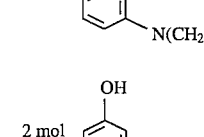 | 2 mol 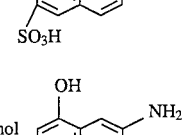 | H₂N⊕(CH₂CH₂OH)₂ |
| 12 | 1 mol 4,4'-diaminodiphenyl-amine-2-sulphonic acid | 2 mol 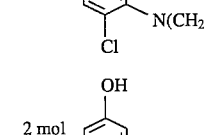 | 2 mol 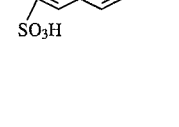 | Li⊕ |
| 13 | 1 mol 4,4'-diaminodiphenyl-amine-2-sulphonic acid | 1 mol 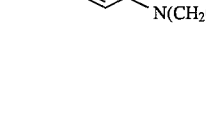 | 2 mol | |

TABLE-continued

| Example | Compound of the formula V | Compound of the formula VI | Compound of the formula IV | M° |
|---------|---------------------------|----------------------------|-----------------------------|----|
|         |                           | 1 mol                      | 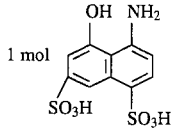        |    |

EXAMPLE 14

A recording liquid having the following recipe is prepared by mixing the components:
4% by weight of dyestuff according to Example 1,
4% by weight of triethanolamine,
77% by weight of distilled water,
15% by weight of diethylene glycol.

We claim:

1. Water-soluble polyazo dyestuffs of the formula I

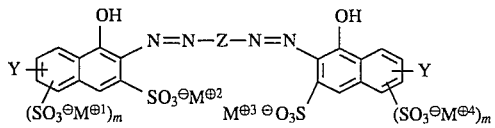 (I)

wherein

Y is the group

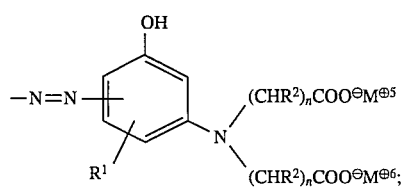

Z is

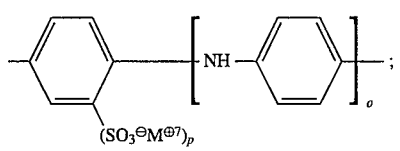

$R^1$ is hydrogen, $(C_1-C_4)$-alkyl or halogen;
$R^2$ is hydrogen or $(C_1-C_4)$-alkyl;
$M^{\oplus 1}$ to $M^{\oplus 7}$ independently of one another are a cation;
m, o and p independently of one another are 0 or 1; and
n is 1 or 2.

2. The polyazo dyestuffs according to claim 1, wherein $M^{\oplus 1}$ to $M^{\oplus 7}$ independently of one another are a lithium cation, a sodium cation or an ammonium cation of the formula II

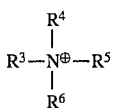 (II)

wherein $R^3$ to $R^6$ independently of one another are hydrogen, $(C_1-C_4)$-alkyl, hydroxy-$(C_1-C_4)$-alkyl or hydroxyethoxy-$(C_1-C_4)$-alkyl.

3. The polyazo dyestuffs according to claim 1, wherein m is 0, $R^1$ is hydrogen and $R^2$ is hydrogen or methyl.

4. The polyazo dyestuffs according to claim 1, wherein $R^1$ and $R^2$ are hydrogen; m is 0; n, o and p are 1 and $M^{\oplus 1}$ to $M^{\oplus 7}$ independently of one another are $Li^\oplus$, $Na^\oplus$ or an ammonium ion of the formula II,

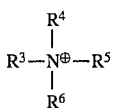 (II)

wherein $R^3$ to $R^6$ independently of one another are hydrogen or hydroxy-$(C_1-C_4)$-alkyl.

5. The polyazo dyestuffs according to claim 1, wherein the Y groups are at position 1, 2 or 3 of the naphthalene skeleton and $-(SO_3^\ominus M^{\oplus 1})_m$ and $-(SO_3^\ominus M^{\oplus 4})_m$ are respectively at position 3 and 4.

6. The polyazo dyestuff according to claim 4, wherein the Y groups are at position 2 of the naphthalene skeleton and $-(SO_3^\ominus M^{\oplus 1})_m$ and $-(SO_3^\ominus M^{\oplus 4})_m$ are respectively at positions 3 and 4.

7. A process for the preparation of polyazo dyestuffs according to claim 1, comprising bis-diazotizing a compound of the formula III

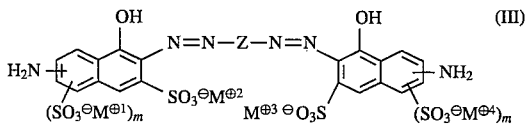 (III)

wherein

Z is

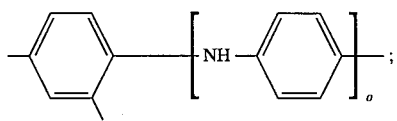

$M^{\oplus 1}$ to $M^{\oplus 7}$ independently of one another are a cation;
m, o and p independently of one another are 0 or 1; and coupling the bis-diazotized compound with a compound of the formula IV

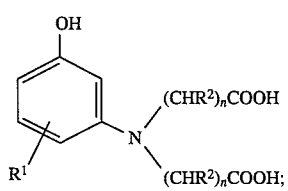 (IV)

wherein $R^1$, $R^2$ and n are as defined above and optionally converting the coupled product into salt form.

8. The process as claimed in claim 7, wherein the coupling is carried out at pH values of about 2 to about 12.

9. The process as claimed in claim 8, wherein the coupling is carried out at pH values of about 7.5 to about 9.5.

10. A process of dyeing leather comprising contacting leather with the polyazo dyestuff according to claim 1.

11. A process of dyeing paper comprising contacting paper with the polyazo dyestuff according to claim 1.

12. A process for preparing writing inks and recording liquids comprising dissolving the polyazo dyestuff according to claim 1 in water.

13. A recording liquid comprising about 0.5 to about 15% by weight of dyestuff of the formula I

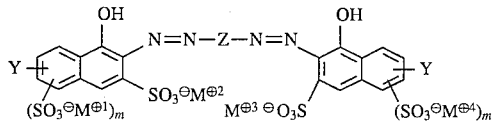

wherein
Y is

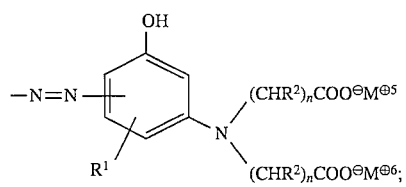

Z is

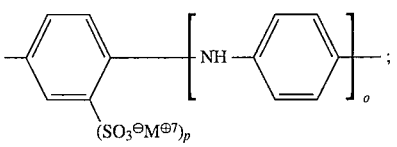

$M^{\oplus 1}$ to $M^{\oplus 7}$ independently of one another are a cation;

m, o and p independently of one another are 0 or 1; and n is 1 or 2;

0 to about 99% by weight of water and about 0.5 to about 99.5% by weight of solvent, humectant or mixtures thereof.

14. Recording liquid according to claim 13, comprising about 0.5 to about 15% by weight of dyestuff of formula I, about 40 to about 85% by weight of water and about 15 to about 50% by weight of solvent, humectant or mixtures thereof.

* * * * *